US006758526B2

(12) United States Patent
Marbutt

(10) Patent No.: US 6,758,526 B2
(45) Date of Patent: Jul. 6, 2004

(54) CHILD'S HEADREST

(76) Inventor: Sherri Marbutt, 127 Ashmore Ct. SE., Calhoun, GA (US) 30701

( * ) Notice: Subject to any disclaimer, the term of this patent is extended or adjusted under 35 U.S.C. 154(b) by 174 days.

(21) Appl. No.: 09/939,961

(22) Filed: Aug. 27, 2001

(65) Prior Publication Data

US 2003/0038520 A1 Feb. 27, 2003

(51) Int. Cl.[7] .............................................. B60R 21/055
(52) U.S. Cl. ............................. 297/392; 297/397; 5/640
(58) Field of Search ................................. 297/391, 392, 297/393, 397, 464; 5/636, 637, 640

(56) References Cited

U.S. PATENT DOCUMENTS

| | | |
|---|---|---|
| 1,510,187 A | 9/1924 | Martin |
| 4,617,691 A | 10/1986 | Monti et al. |
| 4,726,085 A | 2/1988 | Antonio |
| 4,738,488 A | 4/1988 | Camelio |
| 4,776,049 A | 10/1988 | Perron |
| D316,793 S | 5/1991 | Manjarrez |
| D328,683 S | 8/1992 | Kalozdi |
| D335,418 S | 5/1993 | Bowes et al. |
| 5,310,245 A | 5/1994 | Lyszczasz |
| 5,339,472 A | 8/1994 | Yin |
| 5,486,037 A | 1/1996 | Harper |
| 5,505,523 A * | 4/1996 | Wang ............................. 5/640 |
| 5,519,906 A | 5/1996 | Fanto-Chan |
| D393,772 S | 4/1998 | Vingino |
| 5,735,576 A | 4/1998 | Pepys et al. |
| 5,975,638 A * | 11/1999 | Schreiner ..................... 297/398 |
| 6,116,691 A * | 9/2000 | Reece .......................... 297/392 |
| 6,123,389 A * | 9/2000 | O'Connor et al. .......... 297/397 |
| D436,271 S | 1/2001 | Corti |
| 6,266,832 B1 * | 7/2001 | Ezell ............................. 5/640 |
| 2002/0043859 A1 * | 4/2002 | Smith ......................... 297/392 |

* cited by examiner

Primary Examiner—Peter R. Brown
(74) Attorney, Agent, or Firm—Hinkle & O'Bradovich, LLC

(57) ABSTRACT

A child's headrest for baby seats and car seats is disclosed. The headrest generally includes a base pad adapted to receive the child's head and rest over the seat. Two side cushions are connected to the base pad and generally run along the child's temples, cheeks and shoulders, and interconnect under the child's chin. The headrest provides support against side to side and forward motion of the child's head.

11 Claims, 3 Drawing Sheets

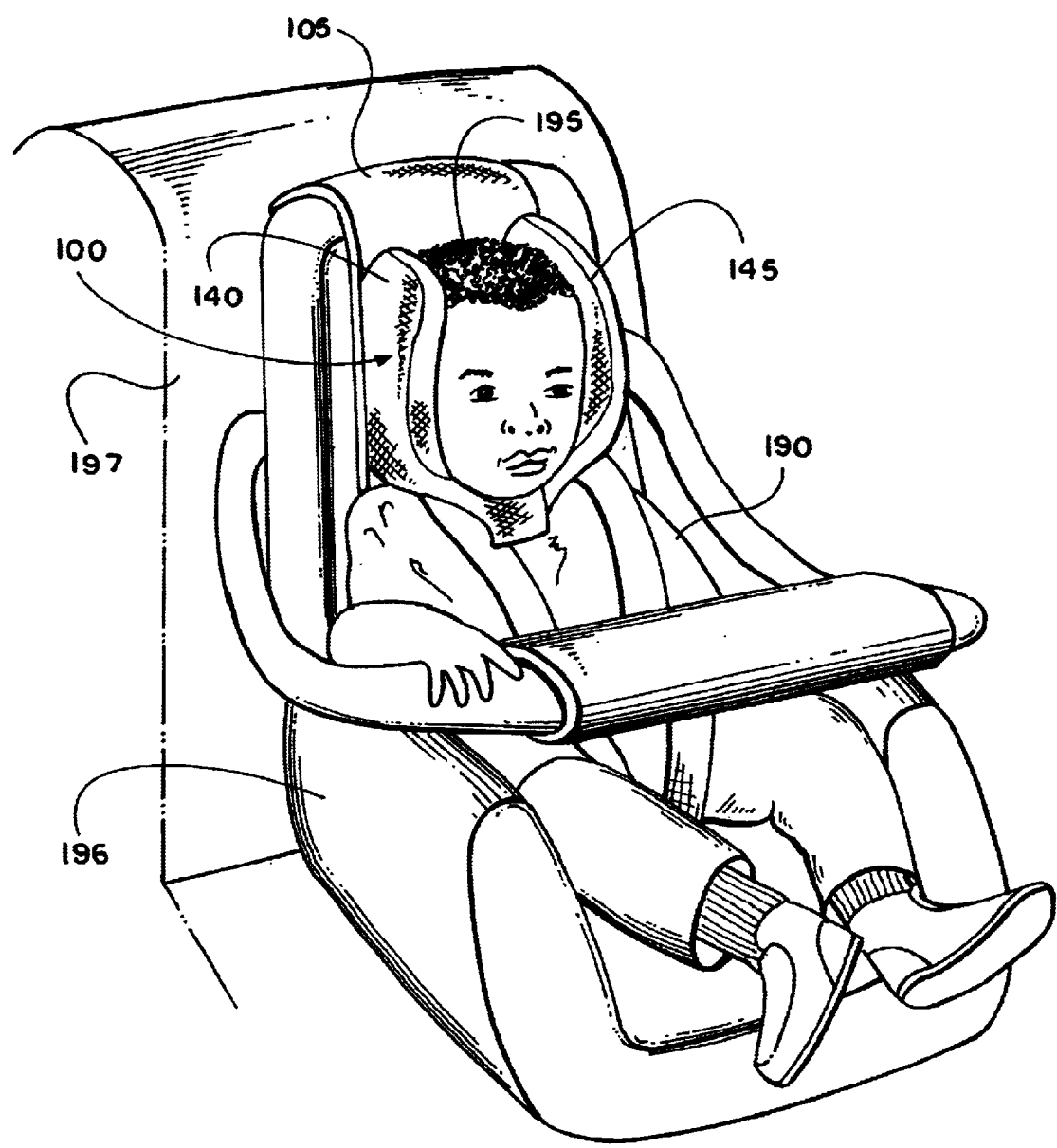
Fig_1

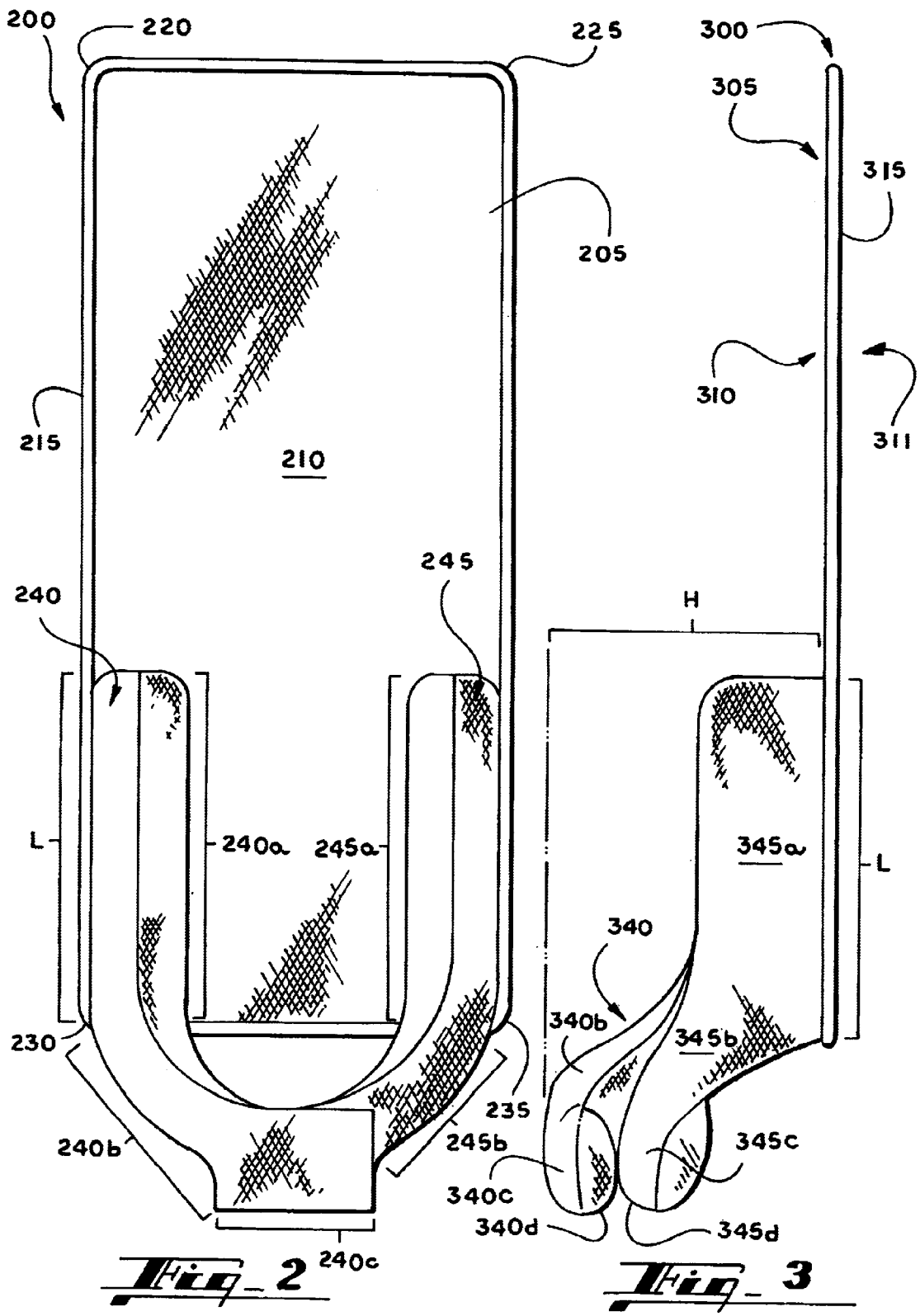

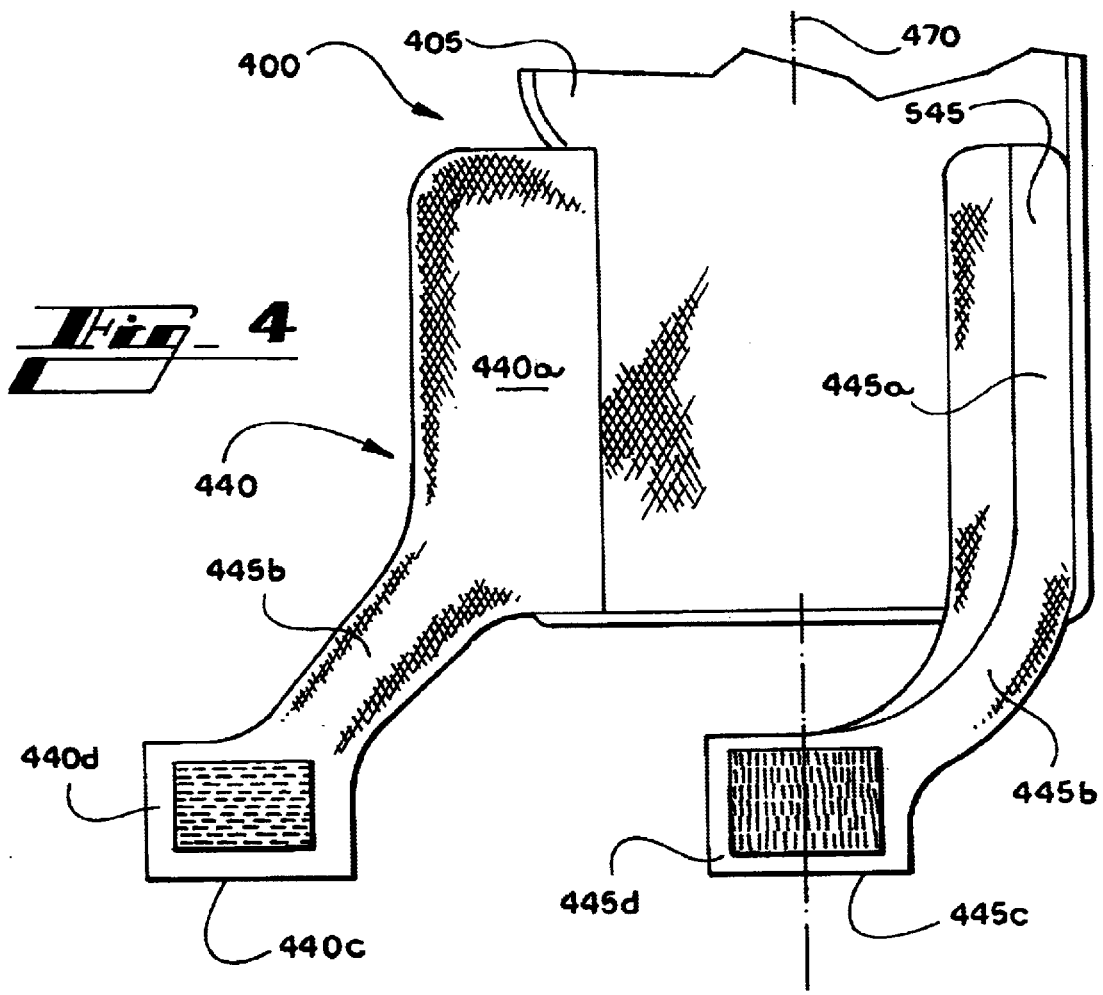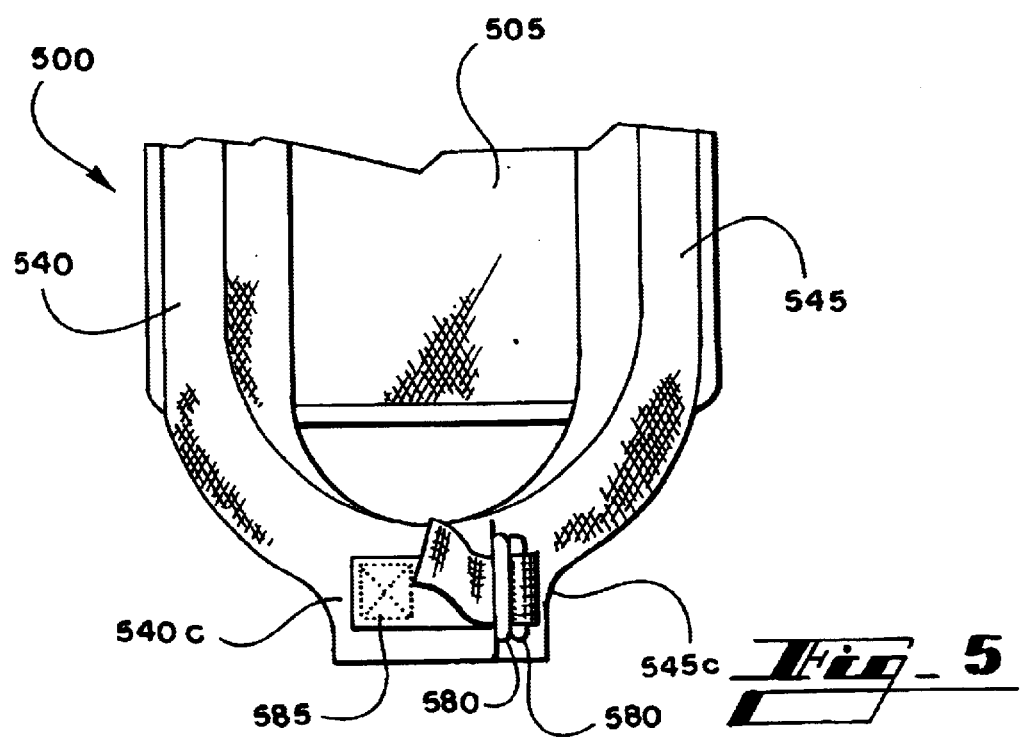

CHILD'S HEADREST

BACKGROUND OF THE INVENTION

I. Field of the Invention

The present invention relates generally to the field of headrests and more particularly to a child's headrest adapted to fit onto car seats and provides stability for undesired motion in the full range of motion of a child's head.

II. Description of the Related Art

Most head rests include thick cushioning and are adapted to fit around the user's neck, resting upon the user's shoulders. These headrests allow motion forward and back and side to side. While the headrests do provide comfort and support, they still allow possible unwanted movement. In particular, for children in car seats and baby seats, the side to side and forward motion can put strain on the child's still-developing neck, shoulders and back. Backward motion is generally prevented by the rear of the seat. But the remaining unwanted motion is not prevented by current headrests.

SUMMARY OF THE INVENTION

In accordance with the present invention and the contemplated problems which have and continue to exist in this field, the present invention provides a headrest that keeps a child's head stable, preventing unwanted motion. The headrest generally fits around the child's face and chin.

In general, in one aspect, the invention features an apparatus including a substantially planar base pad having a first surface and a second surface and a first end and second end and a first and second side cushion connected to the base pad and oriented generally perpendicular to one of the first and second surfaces, the first side cushion being generally parallel to the second cushion.

In one implementation, the first and second cushions include a base portion connected to the planar base, an arm portion connected to the base portion, the arm portion generally protruding away from the base pad at an angle and an end portion connected to the arm portion.

In another implementation, the planar base is generally rectangular defining two corners at the first end and two corners at the second end.

In another implementation, one the base portions is located starting from one of the corners and runs along a length of the base pad, and the other base portion is located starting from another corner and runs a length of the base pad, the two base portions being parallel and in opposition to each other.

In another implementation, the apparatus further includes a first connector located on the end portion of one of the side cushions, and a second connector located on the end portion of the other side cushion, wherein the first and second connectors are adapted to interconnect thereby forming the secure fit of the side cushions on the child's head.

In still another implementation, the side cushions are adapted to be in an open position and in a closed position, wherein the closed position includes one end portion being interconnected with the other end portion and the end portions are overlapped or meet together and are in opposition to each other, and the open position includes the side cushions wherein the end portions are biased toward each other.

In yet another implementation, the base pad includes an upper cloth covering and a lower covering, filler material located between the upper and lower coverings and a border material surrounding and stitched to the upper and lower coverings.

In another implementation, each of the side cushions comprises a filler material surrounded by cloth.

In another implementation, the side cushions are thicker than the base pad and are slightly more rigid than the base pad.

In another aspect, the invention features a headrest, including a flexible planar cushion having four corners, a first side cushion connected to one of the four corners and running a length of the planar cushion and a second side cushion connected to another of the four corners and running a portion of the planar cushion, the first and second cushions being adapted to be generally parallel and in opposition to each other.

In one implementation, the planar cushion is a base pad.

In another implementation, end portions of the side cushions are adapted to be interconnected.

In still another aspect, the invention features a support for a child's head, including a flexible elongated base pad adapted to rest on a car seat wherein a portion of base pad is adapted to receive a portion of the child's head, a first slightly rigid side cushion connected to the base pad that generally contacts a portion of one of the child's temples and cheeks and a second slightly rigid side cushion connected to the base pad that generally contacts a portion of the child's other temple and cheek, the first and second cushion adapted to be interconnected at end portions of each of the respective side cushions, and running generally around the child's temples, cheeks and chin, forming a U shape, thereby supporting the child's head and reducing unwanted motion of the child's head.

In an implementation, the side cushions generally protrude from the base pad, running along the child's shoulders.

In yet another aspect, the invention features a car seat kit, including a car seat, a headrest adapted to be interconnected with the car seat, the headrest having a substantially planar base pad having a first surface and a second surface and a first end and second end and a first and second side cushion connected to the base pad and oriented generally perpendicular to one of the first and second surfaces, the first side cushion being generally parallel to the second cushion.

One advantage of the headrest is that it removes unwanted forward and side to side motion of the child's head.

Another advantage is that the headrest cushions the child's head in the direction that the head may normally fall.

Another advantage is that the headrest can remain in the seat and the child can therefore be easily placed in the seat and headrest without interference from the headrest.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 illustrates a child whose head is supported by an embodiment of a child's headrest;

FIG. 2 illustrates a full frontal view of an embodiment of a child's headrest;

FIG. 3 illustrates aside view of an embodiment of a child's headrest;

FIG. 4 illustrates a partial front view of an embodiment of a child's headrest in one orientation; and FIG. 5 illustrates a partial front view of an embodiment of a child's headrest in an alternate orientation.

DETAILED DESCRIPTION OF THE INVENTION

Referring to the drawings wherein like reference numerals designate corresponding parts throughout the several figures, reference is made first to FIG. 1 that illustrates a child 190 whose head 195 is supported by an embodiment of a child's headrest 100. The headrest 100 is adapted to be used with a baby seat 196 typically used with a car seat 197. One type of baby seat 196 and car seat 197 are shown. It is understood that the headrest 100 can be used with other types of car seats and baby seats.

The headrest 100 typically includes a flexible base pad 105, typically made out of layers of cloth and having a cushioning material between the layers of cloth. The back of the child's head 195 typically comes into contact with the base pad 105. The headrest 100 can further include two side cushions 140, 145 that typically come into contact with the child's face and head 195 at the cheeks and temples. The side cushions 140, 145 wrap underneath the child's head 195 and connect under the child's chin, forming a generally "U" shape, and protruding away from the base pad 105 to rest over the child's shoulders and under the child's chin. In general, the side cushions 140, 145 are slightly more rigid and thicker than the base pad 105.

For larger children who can sit in the car seat 197 without the need of a baby seat 196, the headrest 100 can be also used in conjunction with the car seat 197, in which case, the base pad 105 can be laid over the back of the car seat.

In another implementation, the headrest 100 can remain on the seat (196 or 197) when the child is removed. In this way, the headrest 100 does not interfere with the placing and removal of the child from the seat. In another embodiment, the base pad 105 can include fasteners that connect the headrest 100 to the seat either temporarily or permanently.

The headrest 100 generally has two orientations, open and closed. FIG. 1 illustrates the headrest 100 in the closed orientation, where the side cushions 140, 145 are interconnected. The open position (not shown) generally includes the side cushions not being interconnected and having a slight bias to be in the closed position. It is understood that because the headrest 100 is made of cloth and is flexible, there are several shapes and orientations that the headrest 100 can take. The open and closed orientations are defined to identify the two general functional states of the headrest 100, that is, the open orientation when the headrest 100 is not in use and the closed orientation when the headrest 100 is in use and around the child's head 195.

The headrest 100 allows cushioning in the direction that the child's head would normally fall in the absence of the headrest 100. For example, with a prior art headrest, the child's head 195 could fall left and right. The side cushions 140, 145 prevent the child's head 195 from falling side to side and instead provide cushioning. With a prior art headrest, the child's head may fall forward. With the interconnection of the side cushions 140, 145, the child's head 195 is prevented from falling forward, and instead provides cushioning.

FIG. 2 illustrates a full frontal view of an embodiment of a child's headrest 200. The headrest 200 includes a base pad 205 that is shown flattened and spread. The headrest 200 is in the closed state. The base pad 200 typically includes an upper and lower cloth covering. FIG. 2 illustrates the upper cloth covering 210. A filling material providing cushioning and padding for the child's head is typically located between the upper and lower cloth coverings. An additional piece of border cloth 215 can be stitched along the edges of the upper and lower cloth coverings to retain the filling between the upper and lower coverings.

The base pad 205 is typically planar and rectangular in shape, having four corners 220, 225, 230, 235. At two of the corners 230 and 235 (or 220, 225) and along a length L of the base pad 205, two side cushions 240, 245 are respectively connected to the base pad 205. Typically, the side cushions 240, 245 are stitched to the base pad 205. The side cushions 240, 245 generally include a filler material surrounded by cloth. Most of the remaining length of the base pad 205 is used to drape over the car seat.

The side cushions 240, 245 generally include a base portion 240a, 245a that are typically used to cushion portions of the side of the child's head, generally the cheeks and temples. The base portions 240a, 245a typically prevent unwanted movement of the child's head from side to side. The side cushions 240, 245 can further include an arm portion 240b, 245b that generally run along, and cushion the child's jaw bone. The side cushions 240, 245 can also include an end portion. The end portion 240c is shown for side cushion 240. The end portion for side cushion 245 is covered by end portion 240c and therefore not shown in FIG. 2. The end portions are typically located under the child's chin and generally cushion and support the child's chin and in turn, the child's head. The arm portions 240b, 245b and the end portions typically prevent unwanted forward movement of the child's head. In an embodiment, the end portions are adapted to be connected together to provide a secure fit. When interconnected, the side cushions 240, 245 form a continuous "U" shape around the child's head, with the open part of the "U" located near the top of the child's head, and the closed portion of the "U" located near the child's chin (see also FIG. 1). The "U" shape is not perfect, because the end portions protrude slightly in the direction out of the paper (as shown better in FIG. 3). The interconnectability of the end portions are described in further detail below.

The side cushions 240, 245 therefore prevent unwanted movement of the child's head in its full range of motion.

FIG. 3 illustrates a side view of an embodiment of a child's headrest 300. The headrest 300 is in the closed state. The side view of the headrest 300 illustrates the surrounding border cloth 315 that connects the upper and lower cloth coverings 310, 311 that make up the base pad 305. The side view of the headrest 300 also illustrates a side view of one of the side cushions 345. Similarly to described above with respect to FIG. 2, the side cushion includes a base portion 345a, an arm portion 345b and an end portion 345c. FIG. 3 also illustrates a part of the side cushion 340, that is, the arm portion 340b and the end portion 340c. In an embodiment, the end portions 340c, 345c are adapted to overlap so that they can be interconnected. Typically, one surface 340d of the end portion 340c and one surface 345d of the end portion 345c can be connected to each other to form a secure fit of the headrest 300 around the child's head. As described above with respect to FIG. 2, the interconnected side cushions 340, 345 form a "U" shape. As seen in FIG. 3, the arms portions 340b, 345b actually angle outward from the base pad 305 raising the end portions 340c, 345c a distance, H, from the base pad 305. This distance, H, roughly corresponds to the total distance of the child's chin away from the base pad 305. This distance, H, also helps to ensure that the end portions 340c, 340d clear the child's neck preventing pressure on the child's neck as well as support under the child's chin.

The connectors (not shown) located on the surfaces 340d, 345d can be any suitable device. Such suitable devices include but are not limited to hook and loop fasteners (such as Velcro), snaps, hooks, laces, straps, buttons and the like.

FIG. 4 illustrates a partial front view of an embodiment of a child's headrest 400 in one orientation. The headrest 400 is in the opened state. This orientation illustrates one side cushion 440 "pushed away" and disconnected from the other side cushion 445. The base portion 440a is correspondingly opened and the arm portion 440b protrudes away from the base pad 405. One surface 440d of the end portion 440c faces upward. The side cushion 445 is shown in a "natural" position. This natural position is the position that the side cushions 440, 445 generally take in the opened orientation. The base portion 445a is positioned in a similar orientation as described above with respect to FIGS. 1–3. The arm portion 445b is shown with a bias toward a centerline 470 of the base pad 405.

This bias that both the side cushions 440, 445 have makes it easier for a user to interconnect the end portions 440c, 445c and put the headrest 400 into a closed orientation.

A surface 445d of the end portion 445c is shown facing out of the paper. The surfaces 440d, 445d are illustrated with an embodiment of a connector. In this embodiment two sides 440e, 445e of hook and loop fasteners are shown. The loops side and the hooks side of the hooks and loops fasteners can be on either of the surfaces 440d, 445d. As illustrated earlier in FIGS. 1–3, when the side cushions 440, 445 are put into the closed position, the surfaces 440d, 445d can be overlapped by the user and the connectors 440e, 445e can be interconnected. In other embodiments, the hook and loop fasteners can easily be replaced by other connectors as described above.

FIG. 5 illustrates a partial front view of an embodiment of a child's headrest 500 in an alternate orientation. The headrest 500 is shown in the closed position with the side cushions 540, 545 interconnected. The base pad 505 is shown flat. FIG. 5 illustrates an alternate embodiment of a connector using links 580 located on the end portion 545c of the side cushion 545 and a strap 585 located on the end portion 540c of side cushion 540. The strap 585 can be interweaved with the links 580 to form a secure interconnection of the end portions 540c, 545c.

In other embodiments, the end portions of the side cushions can meet together in opposition rather than overlap as illustrated above. In these embodiments, similar connecting devices can be used to connect the end portions of the side cushions.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. An apparatus, comprising:
    a substantially planar base pad having a first surface and a second surface and a first end and a second end; and
    a first and second side cushion, each cushion having a base portion fully connected to a corner of one of the first and second surfaces of the planar base pad, wherein the base portions are oriented generally perpendicular to one of the first and second surfaces, the base portions being generally parallel to each other, wherein the base portions each include arm portions connected to and generally protruding away from the base portions, the arm portions including end portions having hook and loop fasteners interconnecting the end portions, wherein the arm portions are thinner than the base portions and the end portions.

2. The apparatus as claimed in claim 1, wherein the side cushions are adapted to be in an open position and a closed position, wherein the end portions are disconnected with the arm portions and the end portions pointed toward a centerline of the base pad when the apparatus is in an open state and wherein the end portions are interconnected and the base portions, the arm portions and the end portions generally form a U-shape when the apparatus is in a closed state.

3. The apparatus as claimed in claim 1, wherein the base pad comprises:
    an upper cloth covering and a lower covering;
    filler material located between the upper and lower coverings; and
    a border material surrounding and stitched to the upper and lower coverings.

4. The apparatus as claimed in claim 1, wherein each of the side cushions comprises a filler material surrounded by cloth.

5. The apparatus as claimed in claim 1, wherein the side cushions are thicker than the base pad.

6. The apparatus as claimed in claim 1, wherein the side cushions are slightly more rigid than the base pad.

7. A headrest, comprising:
    a flexible planar cushion having four corners;
    a first side cushion having a base portion fully connected to one of the four corners, wherein the base portion of the first side cushion runs a length of the planar cushion; and
    a second side cushion having a base portion fully connected to another of the four corners, wherein the base portion of the second side cushion runs a length of the planar cushion, the base portions of the first and second cushions being adapted to be generally parallel to each other, wherein the base portions include an arm portion connected to the base portion and an end portion connected to the arm portion, wherein the end portions are adapted to be interconnected with hook and loop fasteners to form a U-shape.

8. The headrest as claimed in claim 7, wherein the planar cushion is a base pad.

9. A support for a child's head, comprising:
    a flexible elongated base pad adapted to rest on a car seat wherein a portion of the base pad os adapted to receive a portion of the child's head;
    a first slightly rigid side cushion having a base portion, arm portion and end portion, the base portion being fully connected to the base pad that is adapted to contact a portion of one of the child's temples and cheeks; and
    a second slightly rigid side cushion having a base portion, arm portion and end portion, the base portion being fully connected to the base pad that is adapted to contact a portion of the child's other temple and cheek, the first and second cushion adapted to be interconnected by hook and loop fasteners at end portions of each of the respective side cushions, and adapted to run along the child's temples, cheeks and chin, forming a U-shape, thereby supporting the child's head and reducing unwanted motion of the child's head.

10. The support as claimed in claim 9, wherein the side cushions protrude from the base pad, adapted to run along the child's shoulders.

11. A car seat kit, comprising:

a car seat;

a headrest adapted to be interconnected with the car seat, the headrest comprising:
- a substantially planar base pad having a first surface and a second surface and a first end and a second end; and
- a first and second side cushion, each having a base portion fully connected to the base pad, an arm portion connected to the base portion and protruding away from the base pad and an end portion having hook and loop fasteners, the end portions being adapted to be interconnected, the base portions being oriented generally perpendicular to one of the first and second surfaces, and being generally parallel to each other.

* * * * *